Figure 7:
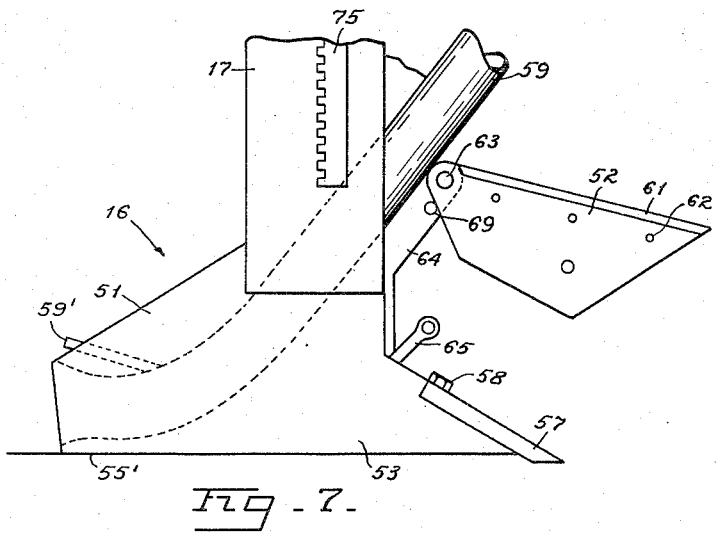

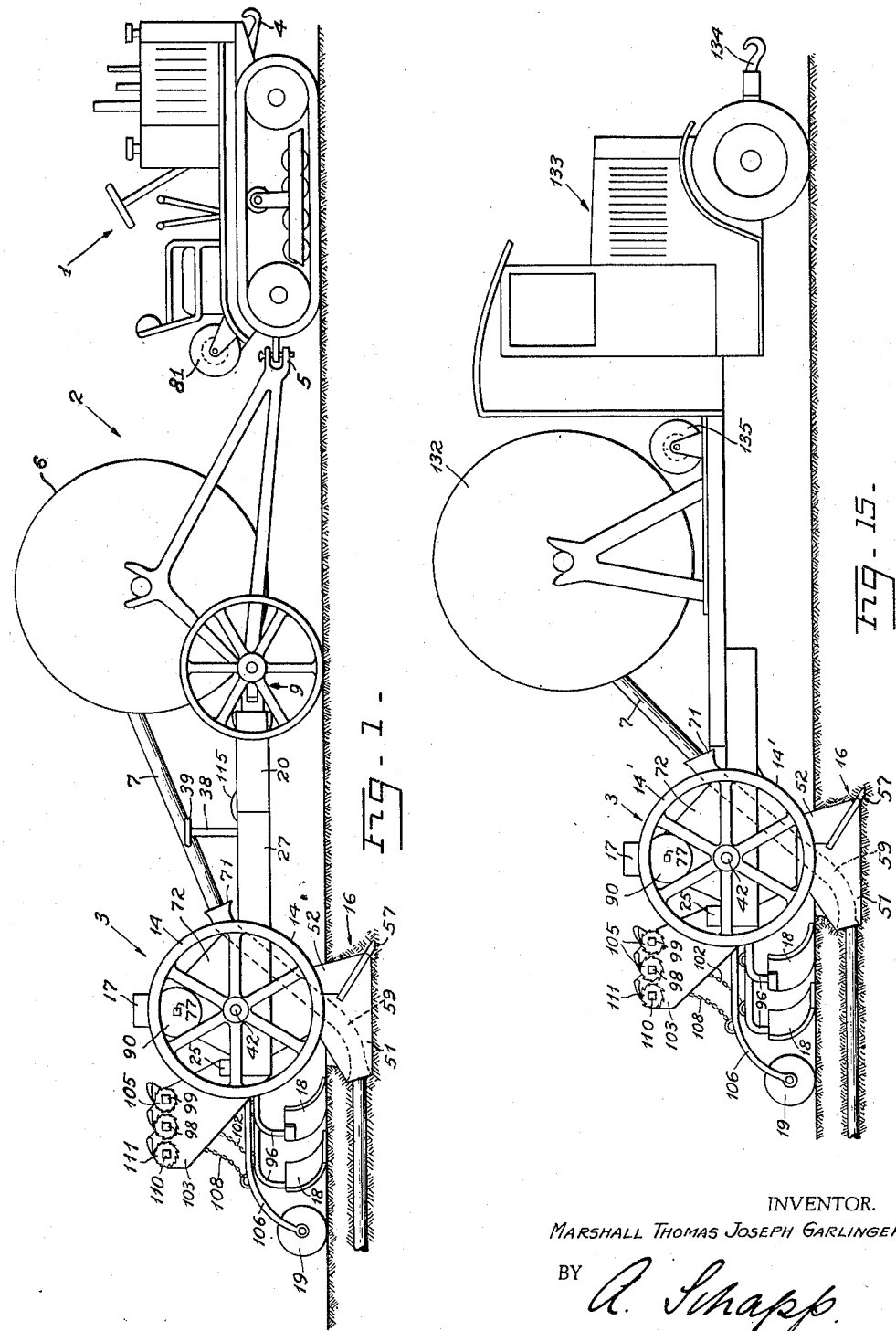

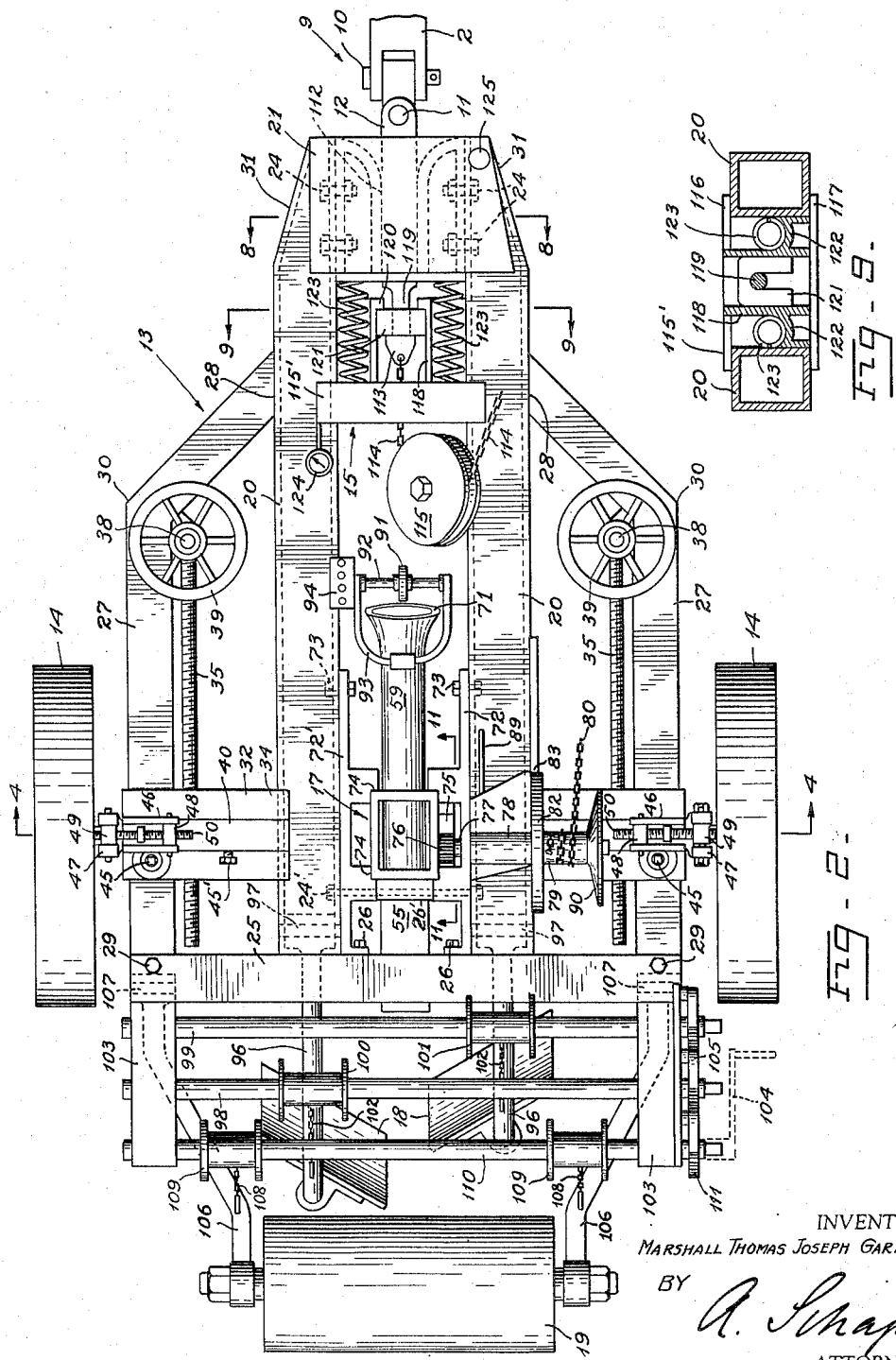

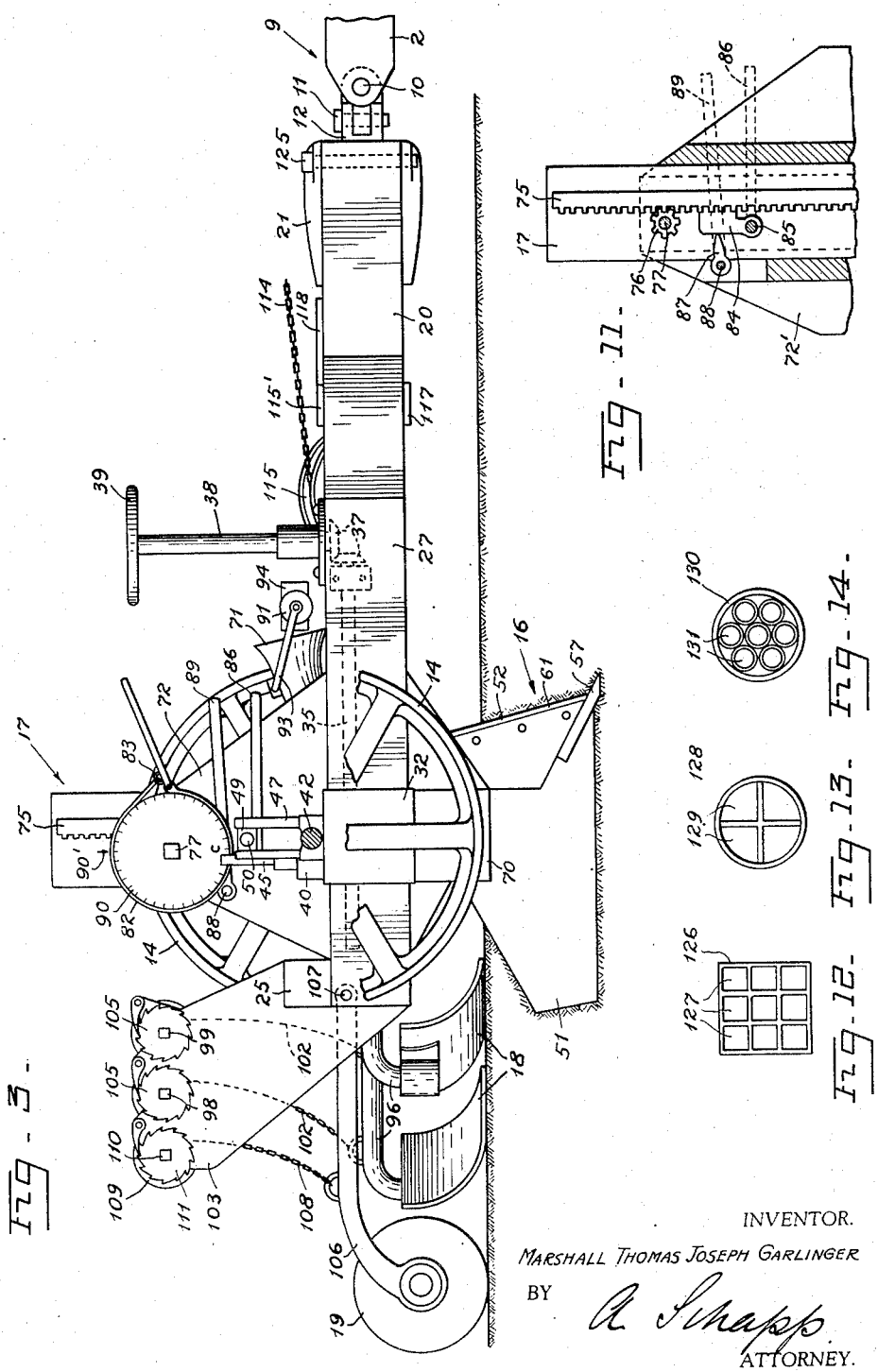

May 24, 1938.   M. T. J. GARLINGER   2,118,553
MACHINE FOR LAYING CABLES, PIPES, AND THE LIKE
Filed Jan. 29, 1936   5 Sheets-Sheet 4
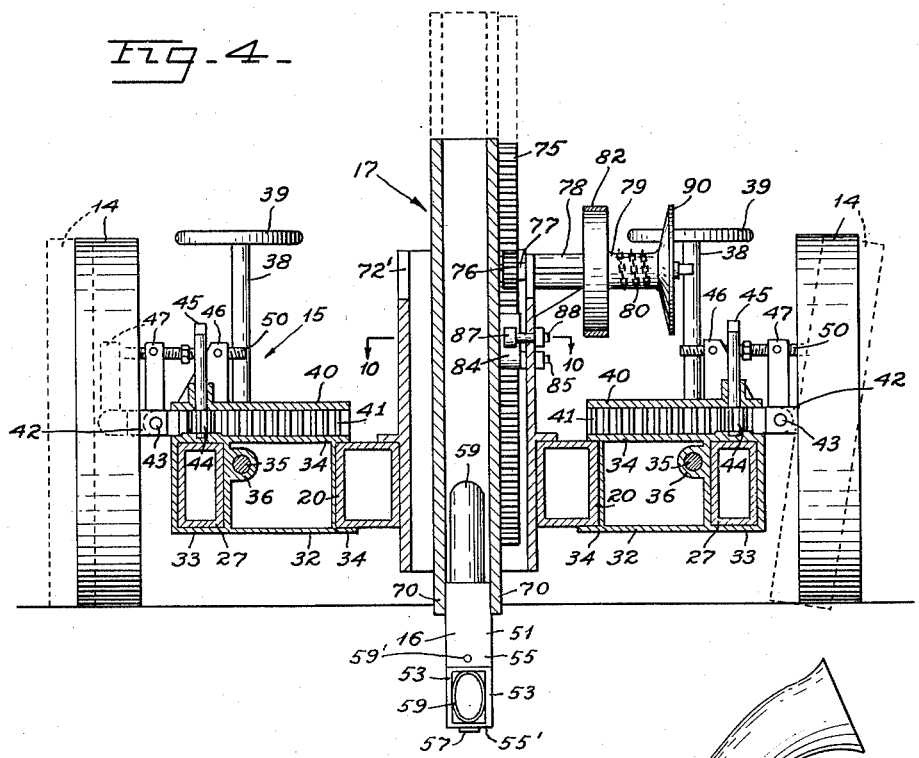
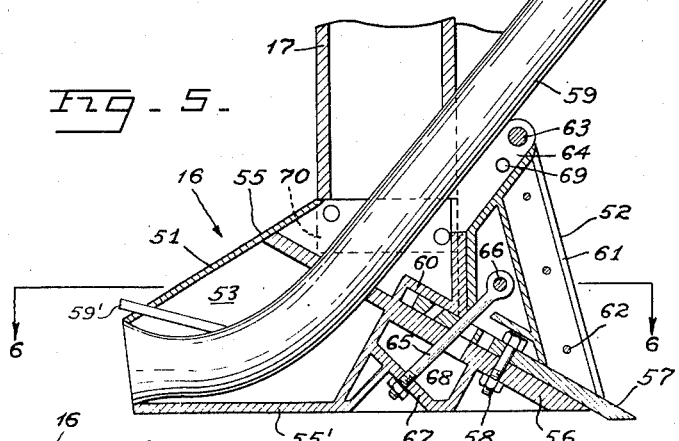
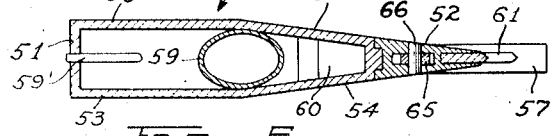
INVENTOR.
MARSHALL THOMAS JOSEPH GARLINGER
BY
A. Schapp
ATTORNEY.

May 24, 1938.   M. T. J. GARLINGER   2,118,553
MACHINE FOR LAYING CABLES, PIPES, AND THE LIKE
Filed Jan. 29, 1936   5 Sheets-Sheet 5

INVENTOR.
MARSHALL THOMAS JOSEPH GARLINGER
BY A. Schapp
ATTORNEY.

Patented May 24, 1938

2,118,553

UNITED STATES PATENT OFFICE 2,118,553

MACHINE FOR LAYING CABLES, PIPES, AND THE LIKE

Marshall Thomas Joseph Garlinger, San Jose, Calif.

Application January 29, 1936, Serial No. 61,387

10 Claims. (Cl. 111—5)

The present invention relates to improvements in machines for laying cables, pipes and the like and its principal object is to provide a machine of the character described that will be particularly efficient in operation and that will lend itself to a great variety of uses.

More particularly my machine is an improvement over the cable laying apparatus described in Patent No. 1,863,671, issued June 21, 1932.

It is especially proposed in the present invention to provide a number of refinements and improvements in the patented machine whereby the operating efficiency of the machine will be greatly improved and increased.

One of the objects of the invention is to provide an improved coupling and alining means whereby the cable laying machine may be quickly and expeditiously connected to a draft vehicle. Since the draft vehicle for a cable laying machine carries the cable reel and has to be disconnected for each length of cable laid, the coupling operation takes place quite a number of times each day and the speed and expediency with which the coupling can be effected is of great importance.

It is further proposed to incorporate the cushioning means in the coupling, together with means for measuring the intensity of draft required to pull the load.

It is further proposed to arrange the wheels of the cable laying machine in such a manner that each wheel can be adjusted in a longitudinal direction and in an axial direction and may also be adjusted to a desired angularity relative to the frame of the machine whereby the efficiency and the adaptability of the machine to many varying conditions is much enhanced.

It is further proposed to provide power-actuated means for raising and lowering a cleaver support forming part of the cable laying machine and to provide mounting means for the cleaver support arranged in such a manner that the cleaver support may be readily removed for repair or substitution purposes.

It is further proposed to provide an improved cleaver arranged so that ready access may be had to a cutting blade forming part of the cleaver and to provide for other improvements and refinements in the construction of the cleaver.

It is a further object of the invention to provide suitable braking, locking means and depth-gauging means in connection with the cleaver support as well as a metering device in connection with the cable feed.

Another object of my invention is to provide means for back-filling the crevice cut by the cleaver and for tamping the disturbed region in one operation with the laying of the cable.

Further and other objects and advantages of my invention will appear as the specification proceeds.

The preferred form of my invention is illustrated in the accompanying drawings in which Figure 1 shows a side elevation of a complete cable laying outfit including a tractor, a reel carrier and a cable laying machine forming the special subject matter of my invention, Figure 2 a top plan view of my machine, Figure 3 a side elevation of the same with one wheel removed. It should be understood that a sled, tracklayer, or articulated wheel frame may be substituted for the wheel.

Figure 10:
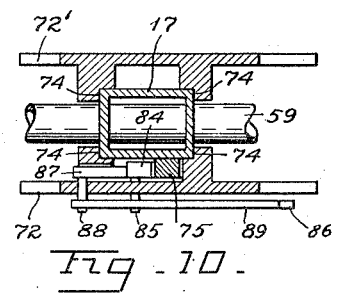
Figure 8:
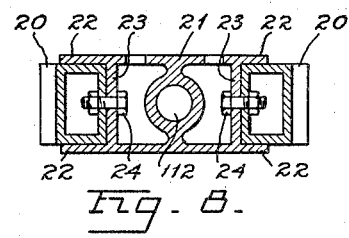
Figure 16:
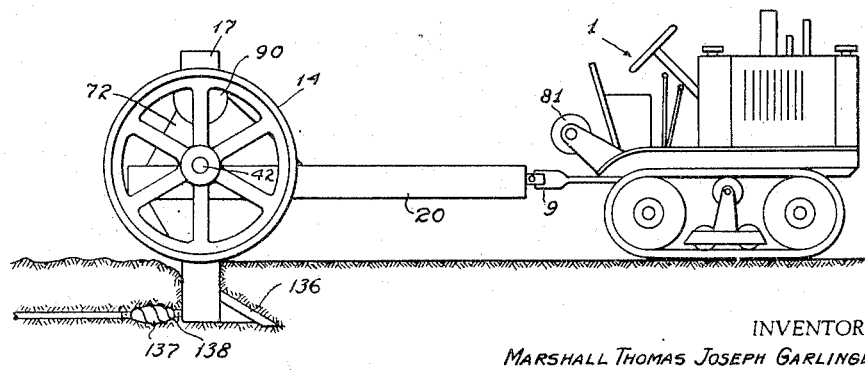

Figure 4 a transverse section taken along line 4—4 of Figure 2,

Figure 5 a vertical, longitudinal section through the cleaver used in my machine, Figure 6 a horizontal section through the cleaver taken along line 6—6 of Figure 5, Figure 7 a side elevation of the cleaver, with a front section raised to give access to the cutter, Figure 8 a vertical transverse section through the front portion of the machine, taken along line 8—8 of Figure 2, Figure 9 a similar section taken along line 9—9 of Figure 2, Figure 10 a horizontal section taken along line 10—10 of Figure 4, Figure 11 a fragmentary vertical section taken along line 11—11 of Figure 2 and showing the upper portion of the cleaver support and associated parts, Figures 12, 13, and 14 end or sectional views of different shapes of feeding tubes, Figure 15 a side elevation of a modified cable-laying outfit, and Figure 16 a side elevation showing a modified outfit including an exploring cleaver and means for laying pipe that does not bend with sufficient ease for feeding from a reel; for, when exploring the soil, the spiral mole may or may not be employed.

While I have shown only the preferred forms of my invention I wish to have it understood that various changes or modifications may be made within the scope of the claims hereto attached without departing from the spirit of the invention. Particularly it should be understood that while I have described my machine principally as a cable laying machine it may be used for laying pipes, tubes, drain tile, wire and any other material of similar characteristics, as well as in farming operations in which it is desirable to cut deep crevices or furrows for cultivating, irrigating, draining, planting, fertilizing and other purposes, and all of these objects are to be considered the equivalents of the expression cable wherever used in this specification.

The preferred arrangement is shown in Figure 1 from which it appears that a complete cable laying outfit usually consists of or includes a tractor 1, a reel carrier 2 and the cable laying machine 3. It is apparent that any other draft means may be substituted for the tractor and that additional power may be obtained by adding further tractors which may be secured to the tractor shown by means of the hook 4. The reel carrier is attached to the tractor by the conventional coupling 5 and has the reel 6 mounted thereon from which the cable 7 is fed to the cable laying machine 3. It is connected to the cable laying machine by means of the universal coupling 9 including a horizontal pivot 10, a vertical pivot 11 and the pin 12 projecting from the latter pivot.

The cable laying machine comprises in its principal features a frame 13, wheels 14 with their adjusting mechanism, a coupling and alining device 15, a cleaver 16 and its supporting post 17 and operating mechanism for the same, the back fillers 18 and the tamper 19 with their operating mechanisms.

The frame 13 comprises in its principal features two longitudinal beams 20 arranged in spaced relation and connected in front by the casting 21 (see Figure 8) which has flanges 22 straddling the beams and webs 23 lying against the inner faces of the beams and being secured thereto by means of bolts 24. The two beams are preferably made hollow and rectangular in cross-section and their rear ends are held in fixed and spaced relation by a bolt 24' and by being bolted to a cross-member 25 as shown at 26.

In addition to these two beams, which may be referred to as the inner beams, I provide two outer beams 27 which are rigidly secured to the inner beams at 28 as by welding and the rear ends of which are bolted to the cross-member 25 as at 29. The outer beams run parallel to the inner beams through the major portion thereof, and are bent in their front portions as at 30 to join the inner beams. The latter are tapered in their front portions as shown at 31.

The wheels 14 support this frame with freedom of adjustment in three different ways, longitudinally, laterally and angularly. Instead of wheels, sleds may be used or tracklayer tracks, articulated wheel frames and the like, all of which are intended to be covered by the expression wheels wherever used.

For receiving the axles of the wheels I provide two bearing blocks 32 which are slidably mounted on the outer and inner beams on each side of the frame. The specific construction of these blocks is shown in Figure 4, each block comprising a rectangular box 33 slidable on the outer beam and horizontal top and bottom plates 34 projecting from the box over the intervening space into straddling relation with the inner beam. Each block may be moved along the beams by means of the screw 35 threaded into a nut section 36 of the block and actuated, through the bevel gears 37 (see Figure 3), by means of the post 38 and the hand wheel 39. Due to the screw engagement the block will be locked in any position to which it may be adjusted.

Each of the blocks carries a housing 40 to slidably receive the inner axle section 41 which is pivoted to the outer axle section or spindle 42 as at 43. The inner axle section is made in the form of a rack rod and meshes with the pinion 44 which latter may be turned by means of a wrench engaging the squared end of the pinion shaft 45. It will be noted that in this manner the wheels may be adjusted laterally for adjusting the width of the track so as to make the latter correspond to the tread of the preceding vehicles for facilitating the travel of the wheels. The rack rod is locked in adjusted position by the set screw 45'.

For tilting each wheel I provide two brackets 46 and 47, one rising from the block 32 and the other from the spindle 42 and each of these brackets has a trunnion block 48 and 49 to threadedly receive the screw 50 which has a left hand thread at one end and a right hand thread at the other end and an angular head in the center by means of which it may be operated. When the screw is turned in one direction the wheel will be made to tilt outward with its upper portion as indicated in Figure 4 and if the screw is turned in the opposite direction the wheel will move through rectangular position to an opposite angularity.

Thus each wheel may be independently adjusted longitudinally by operation of the hand wheel 39, laterally by operation of the pinion shaft 45 and angularly by operation of the screw 50.

The cleaver 16 with its supporting post 17 occupies the central position of the frame. The cleaver is illustrated in detail in Figures 5 and 6 and its general characteristics are that it is a narrow vertical body tapering to an inclined cutting edge in front and provided with a horizontal cutting edge at the bottom. It is made in two sections 51 and 52, the former section being a box-like structure with approximately parallel side walls 53 converging toward the front as at 54, an inclined rear wall 55, a bottom wear plate 55' and a front wall which is vertical in its upper portion and inclined in its lower portion as at 56 to form a seat for the blade 57 which is bolted thereto by the bolt 58. The blade is provided with a plurality of bolt holes so that it may be advanced as the cutting edge wears off. The inclined portion 56 is continued through the body to the rear wall 55 to brace the cleaver and to form a bearing for the feed pipe 59 which extends obliquely through the cleaver and terminates with a flared end at the bottom of the rear wall of the cleaver. The front wall of the section 51 has an undercut 60 over the wall 56 to receive the rear end of the blade 57.

The section 52 forms the front of the cleaver. It has an inclined front edge formed with a groove adapted to receive the root-cutter blade 61 which is held in place by rivets 62. It is pivoted on the pin 63 which latter is supported in a flange 64 depending from the feed pipe 59 and when in active position its bottom edge rests on the blade 57. It is firmly held in place by an eye bolt 65 pivoted to the pin 66 extending transversely through this section and bolted to a cross-rib 67 provided in the bottom of the first section 51. The inclined seat 56 and the blade are suitably apertured as at 68 to allow the bolt to move when the front section 52 is swung upward on its pivot 63. The flange 64 is provided with an aperture 69 below the pivot 63 so that when the front section is swung upward, a bolt may be inserted through the aperture as shown in Figure 7 for holding the front section in raised position. Any other suitable locking arrangement may be substituted for the means described.

It will be noted that in this manner the front section, upon loosening of the eye bolt 65, either at the bottom or at the eye, may be swung upward and locked in raised position so as to give ready and easy access to the blade 57 for adjustment, repair or substitution of a new blade.

Since front section 52 is subjected to considerable wear, the entire section, as well as the root-cutter blade 61, may also be easily removed, repaired or replaced. This will increase the operating economy and efficiency of the entire machine.

The supporting post 17, which is hollow and rectangular in cross-section extends vertically upward from the cleaver and is secured to the latter by extended sides 70 straddling the upper portion of the cleaver and riveted or otherwise permanently fastened thereto. The feed pipe 59 extends through the lower portion of the post 17 and then forwardly to terminate in a flaring mouth 71. The ends of the feed pipe are slightly curved in opposite directions to resemble the letter S. In order to maintain the feed pipe in clean condition I provide suitable means therefor, here shown as an acetylene torch 59', which may be permanently or removably mounted on the feed pipe and by means of which any inflammable or other residue left in the pipe may be burnt out, the pipe serving as a chimney to furnish the necessary draft.

The post 17 is vertically guided between two confronting guide elements 72 and 72' bolted to the inner faces of the inner beams 20 as at 73 and to the cross-member 25 as at 26 and the elements are formed to provide four guide grooves 74 for the four corners of the post. The bolt 24' passes through the guide elements and an interposed spacer 26'.

For raising and lowering the post and for holding it in adjusted position I provide means here shown as a rack 75 on one of the side faces of the post and a pinion 76 to mesh therewith. The pinion has a shaft 77 which is supported in a bearing 78 and is provided, at its free end, with a drum 79 which has a chain 80 wound thereon. This chain may be connected, by any suitable means, to the power-driven winch 81 provided at the rear end of the tractor as shown in Figure 1, so that the cleaver post may be positively actuated in either substantially vertical direction by the power plant of the tractor, the direction of movement being reversed by reversing the winding of the chain on the drum.

On one side of the drum 79 I provide a brake drum 82 with a suitable brake mechanism indicated at 83 in Figure 3 for temporarily holding the post in position during adjusting operations. For more permanently holding the post in position I provide means here shown as the mechanism illustrated particularly well in Figure 11 and comprising a small rack 84 pivoted on the pin 85 and supported in the guide element 72 and adapted for meshing with the rack rod 75 when swung into vertical position by means of the lever 86. While the weight of the lever has a normal tendency to hold the rack 84 in locking position I provide additional positive locking means in the cam 87 which is pivoted behind the rack as at 88 and which is actuated by a second lever 89.

The drum 79 is provided with an outer flange 90, the outer face of which is graduated to form a dial indicating the depth of the crevice cut by the cleaver or the coverage over the laid material when the wheels rest on the ground surface. A particular point, as at C may be identified on the dial as indicating when the cleaver is raised sufficiently to clear the ground surface when the machine is in transit. An arrow 90' points toward the dial.

At the upper end of the feed pipe for the cable I provide a metering device in the form of a friction wheel 91 which rides on the cable and is rotated thereby. The wheel is supported on a shaft 92 mounted in a bracket 93 and the shaft operates the counter 94 to indicate the length of cable passing through the feed pipe.

Rearwardly of the cleaver I provide means, here shown as back-filler blades 18 which serve the purpose of throwing the disturbed material back into the crevice and to cover the cable or material laid. The blades are preferably staggered, as shown in the drawings, and are mounted on the rear ends of two plow beams 96, the front ends of which are pivoted in the rear ends of the main frame beams 20 as shown at 97. For raising the blades when the machine is in transit or to clear objects, I provide means, here shown as two shafts 98 and 99 above the plow beams with drums 100 and 101 which are connected, through chains 102, with the plow beams. The shafts are supported in brackets 103 projecting rearwardly from the outer main frame beams 27 and may be revolved by means of a crank handle 104 engaging the squared ends thereof. Suitable pawl and ratchet arrangements 105 may be used to hold the shafts against reverse motion.

The back-filler blades are followed by suitable tamping means such as the roller 19 pivoted in the rear ends of two arms 106, the front ends of which are hinged to the rear ends of the main frame beams 27 as shown at 107. The roller may also be lifted into inactive position by means of chains 108, one end of which is secured to the drums 109 fixed to the shaft 110 supported in the brackets 103 and operable by means of the crank handle 104 previously mentioned. A pawl and ratchet arrangement 111 serves to hold the roller in raised position.

Difficulties are encountered frequently in the coupling of the cable laying machine to the reel carrier, particularly in view of the heavy weights involved and the unevenness of the ground surface found in field operations. To overcome these difficulties which are often accompanied by serious hazards to the operators and which always result in considerable lost time, I provide the special coupling and alining means 15 shown in the front portion of the cable laying machine.

The casting 21, previously mentioned as serving the purpose of holding the front ends of the beams 20 in fixed relation, is provided with a central conduit 112 which is circular in cross-section and has an outwardly flaring rounded front portion, adapted to receive the pin 12 projecting from the universal joint 9. This pin terminates in a head 113. A chain 114 is secured to this head and is guided over a sheave 115 which is slantingly mounted on one of the beams 20 so that its receiving point is in alinement with the conduit 112. For coupling operations the free end of the chain 114 is connected, by any suitable means, to the winch 81 on the tractor, so that, when the winch is turned by the power plant of the tractor, the two vehicles will be drawn together and will automatically aline themselves due to the fact that first the chain and then afterwards the pin 12 are guided by the conduit 112.

Back of the casting 21 a transverse frame 115' is slidably mounted on the two inner frame beams 20 by means of top and bottom plates 116 and 117 riding on the top and bottom faces of the beams. Two vertical plates 118 project forwardly from the transverse plates spaced by a distance substantially equal to the diameter of the conduit 112 and are adapted to receive between the same the head 118 of the pin 12 which is followed by a round neck portion 119. The two vertical plates have inward projections 120 at their forward extremities and when the head has advanced to the position shown in the drawings (Figure 2) a C washer 121 may be dropped behind the head over the neck portion for holding the head against withdrawal.

The outer faces of the vertical plate 118 have flanges 122 curved to form beds for springs 123 and bent downward at their outer ends to bear against the main beams 20. The springs serve as cushioning members between the cable laying device and the draft vehicle and also indicate by the extent of their compression, the resistance offered by the cable laying machine to the forward pull. A suitable instrument 124 of the dynamometer type may be used for translating the spring compression into terms of power used for advancing the machine which will lead to quick detection of abnormal conditions or obstacles encountered by the cleaver and will also be found useful in testing the power of any draft vehicles, or means of draft.

At times it may become necessary to remove the cleaver and its supporting post from the machine for repair purposes or substitution of a different kind and I have provided in my machine a very simple means of accomplishing this purpose. As has been stated before the front ends of the beams 20 are held in fixed and spaced relation by the front casting 21 through the bolts 24. In addition to this fastening means I provide a pivotal connection 125 between the front end of one of the beams 20 and the casting 21. When I desire to remove the cleaver post I remove the bolts 24, 24', 26 and 29 connecting the rear ends of the four main beams to the cross-member 25, whereupon the rear end of the machine may be opened in a scissor-like action, turning on the pivot 125, so as to free the cleaver post. A forward draft of the machine will then pull the machine away from the cleaver post. In the same manner the machine may be re-engaged with the cleaver post by a reversal of operation.

It should be understood, of course, that only a few inches of separation between the two halves of the frame are required for clearing the post and that such portions of the back-filling and tamping devices as are in the way have to be removed for this operation.

While the feed pipe for the cable is shown in the main figures as a single conduit, it is apparent that it may be readily changed to serve various purposes, particularly for laying several different objects at the same time. Thus I have shown the feed pipe 126 in Figure 12 as being rectangular in form and as being divided into nine rectangular conduits 127, while the pipe 128 of Figure 13 is circular in cross-section, with four sector-shaped subdivisions 129 and the pipe 130 of Figure 14 is circular in cross-section and is subdivided into a number of conduits 131 also circular in cross-section.

Figure 15 shows a modification in the arrangement of the whole outfit insofar as the reel 132 is carried directly by the truck 133 which also furnishes the power of the draft. In case additional power is required, a tractor may be placed in front and connected to the truck by means of the hook 134. The power winch 135 in this case is disposed on the bed of the truck. The wheels 14' of the laying device serve at the same time for rear wheels for the truck.

In the form shown in Figure 16 a simplified cleaver 136 known as an explorer is substituted for the cleaver previously described. No feed pipe for the cable is provided and the object of using the explorer is to test the ground for obstacles and to prepare the way for the regular cleaver where the ground is in such condition that it would be too difficult to break the ground and lay the cable in one operation. This simplified cleaver may be used for laying rigid pipes or pipes that will not readily bend and cannot be fed from a reel, as well as materials which can be reeled. In this case a furrow or ditch may be prepared corresponding to the depth to which the pipe is to be laid and sufficiently long to accommodate a pipe length. This pipe length is then connected to the cleaver by means of the spiral mole 137 which is swivelled to the cleaver as at 138 and which is larger in diameter than the pipe and the cleaver is drawn through the ground in the same manner as previously described, it being understood that the revolving spiral mole may or may not revolve the pipe. When one pipe length is laid a second length is connected to the rear end thereof and the cleaver is again advanced by the distance of that pipe length, when a third section is joined. The spiral mole can also be used to lay other material herein mentioned.

The operation of my machine is as follows:

Assuming the outfit is assembled substantially as shown in Figure 1, consisting of a tractor, a reel carrier and the cable laying machine, with the cleaver above the ground, the first operation is to adjust the cleaver into working position. For this purpose the rack 84 is first released and the cleaver lowered to the ground surface by gravity, the brake being used to control this downward movement. Next the chain 88 is connected, by any suitable means, cable or rope, to the power winch 81 and the drum 79 is revolved for effecting further relative movement between the cleaver post and the frame of the cable laying machine. Since the post cannot move further, part of the frame 13 will be lifted off the ground and this operation is continued until the dial on the flange or disc 90 indicates the proper relationship. Cleaver post 17 is now locked as described. Next the laying machine is pulled forward and the cleaver will dig itself into the ground surface to the desired depth.

Instead of following this procedure the operator may prepare a hole underneath the cleaver of the desired depth and lower the cleaver into the hole by gravity, the cable or the like being held as below mentioned.

The cable of the reel is guided through the feed pipe 59 and is held by any suitable means until the length of the cable laid and covered offers sufficient earth-frictional seizure to hold the same in place.

The wheels may be adjusted in the manner previously described to suit working conditions. The tread of the wheels may be adjusted by lateral movement to correspond to that of the tractor or the reel carrier or both. When working on a hill side the wheels may be tilted to the proper angularity to compensate for the slope. The wheels may be adjusted longitudinally to effect proper balancing of the forces and best operating conditions of the cleaver and exit end of the feed tube. The wheels roll on the ground and maintain the cleaver in such position that material is laid at constant depth, or at constant coverage.

The filler blades are lowered to the ground surface and due to their staggered relation fill in first from one side and then from the other while larger rocks are allowed to escape between the same. The roller or tamper finally urges the disturbed material back into the crevice cut by the cleaver and firmly packs the same.

The metering device in the counter 94 indicates the length of cable fed.

The springs 123 serve as cushioning means or shock absorbers and lengthen the life of the machine, while at the same time they allow the intensity of the draft to be measured in the dynamometer 124, also unusual obstacles to be readily discovered and the condition of draft means to be determined.

After the entire length of cable has been fed from the reel, the reel carrier is disconnected and pulled by the tractor to a place where a new reel may be substituted for the empty one. The reel carrier is then maneuvered back into approximately the correct place for recoupling, the chain 114 is guided through the conduit 112 and over the sheave 115 and is connected to the power winch 81. Upon application of power the pin 12 is drawn through the conduit 112, during which operation the reel carrier and the cable laying machine automatically aline themselves, and after the pin 12 has reached the proper position it is locked in position by dropping a C washer 121 in position behind the head 113 of the pin. The new cable or the like may now be fastened to the cable previously laid and further operations proceeded with. Pin 12 may oscillate in conduit 112 to allow for angular alinement on uneven soil or earth surface between the laying machine and the other vehicles.

If soil conditions on account of buried or hidden obstacles make such procedure desirable, the laying machine may be preceded by the explorer shown in Figure 16, which should be adjusted to cut somewhat deeper than the intended depth of the cable or the like. The spiral may or may not be used in this operation.

The apparatus as shown in Figures 1 and 15 can also be used for exploring. Back-fillers 18 and tamper 19 may or may not be raised from the ground as desired.

I claim:

1. A machine of the character described comprising a vehicle having two frame sections, one pivoted to the other in the front of the vehicle, means for detachably connecting the rear ends of the frame sections, confronting guide elements on the two frame sections and a cleaver support adjustably held between the guide elements, one of the sections with its guide element being swingable on the pivot when the rear connecting means is detached for releasing the cleaver support.

2. A machine of the character described comprising a frame, earth cleaving means carried thereby made to cut a crevice in a surface, a feed tube having an exit end for delivering a cable or the like into the crevice cut by the cleaving means, a pair of wheels supporting the frame, means for axially moving the wheels individually for adjusting the space between the wheels and the relative position of the cleaving means and the exit end of the feed pipe with respect to the wheels, and means for securing the wheels in adjusted position.

3. A machine of the character described comprising a frame, earth cleaving means carried thereby, a feed pipe associated with the cleaving means having an exit end, a pair of wheels supporting the frame, and means for individually moving each wheel longitudinally of the frame for effecting a desired placing of the cleaving means and exit end of the feed pipe in relation to the axes of the wheels.

4. A machine of the character described comprising a frame, earth cleaving means carried thereby to cut a crevice in a surface, a feed tube associated with the cleaving means, a pair of wheels supporting the frame and mounted tiltably relative thereto, and means for tilting each of the wheels individually, whereby the wheels can be tilted without effecting the cleaving means.

5. In a machine of the character described, a vehicle having a pair of frame sections, means hinging one section to the other at one end of the frame sections, detachable connecting means normally holding the frame sections against swinging movement relative to each other, confronting guides on the frame sections, and a cleaver support adjustably held between the guides, the frame sections being swingable on the hinging means away from each other when the connecting means is detached for releasing the cleaver support.

6. In a machine of the character described, a vehicle having a pair of frame sections, means hinging the frame sections together at one end thereof, means detachably connecting the other ends of the frame together, confronting guide elements on the frame sections, a cleaver support adjustably held between the guide elements, a spacer interposed between the guide elements, and a bolt passing through the spacer and the frame sections, for drawing the latter upon the cleaver support, the frame sections being swingable on the hinging means when the connecting means are detached and the bolt removed for releasing the cleaver support.

7. In a machine of the character described, a frame, wheel-supported axle sections carrying the frame and arranged to leave a space between the sections, and a cleaver support mounted in said space with freedom of vertical adjustment.

8. In a machine of the character described, a frame, wheel-supported axle sections carrying the frame and arranged to leave a space between the axle sections, and a cleaver support mounted in said space with freedom of vertical adjustment, the cleaver support having a cleaver with a removable blade at the lower end thereof and the frame being open in front of the cleaver support to permit of access to the blade of the cleaver when the latter is raised into the frame for blade-adjusting and blade-changing operations.

9. In a machine of the character described, a frame, wheel-supported axle sections carrying the frame and arranged to leave a space between the axle sections, a cleaver support mounted in said space with freedom of vertical adjustment, and means for adjusting the axle sections longitudinally of the frame.

10. A machine of the character described comprising a vehicle including a frame and a pair of supporting wheels and having earth-cleaving means carried by the frame, means for individually moving each wheel longitudinally of the frame for effecting a desired placing of the cleaving means in relation to the axes of the wheels, means for axially moving the wheels individually for adjusting the space between the wheels and the relative position of the cleaving means with respect to the wheels, and means for tilting each of the wheels individually whereby the wheels can be tilted without affecting the cleaving means.

MARSHALL THOMAS JOSEPH GARLINGER.